United States Patent [19]

Owen

[11] 3,861,562

[45] Jan. 21, 1975

[54] UNIVERSAL VENDING MEANS FOR PACKAGED MATERIALS IN A VENDING DEVICE

[76] Inventor: Charles R. Owen, 8101 Evergreen, Little Rock, Ark. 72207

[22] Filed: May 7, 1973

[21] Appl. No.: 357,705

[52] U.S. Cl. .................................................. 221/85
[51] Int. Cl. ............................................ G07f 11/58
[58] Field of Search .................... 221/82, 84, 85, 91

[56] References Cited
UNITED STATES PATENTS

| | | | |
|---|---|---|---|
| 2,351,432 | 6/1944 | Jennings et al. | 221/85 X |
| 2,875,877 | 3/1959 | Hoban | 221/85 X |
| 3,716,165 | 2/1973 | Patrick | 221/85 |

Primary Examiner—Robert B. Reeves
Assistant Examiner—Francis J. Bartuska
Attorney, Agent, or Firm—Clarence A. O'Brien; Harvey B. Jacobson

[57] ABSTRACT

A tray assembly for use in a vending device for dispensing products in the form of a modular structure which incorporates a plurality of open-ended box-like or basket-like containers or carriers connected to or incorporated into an endless chain that is motor driven and a shelf defining a supporting surface underlying the containers or carriers to retain products, articles or contents therein until the container or carrier is moved into a position where the underlying supporting shelf does not provide a supporting surface. The shelf is constructed with a recess or void area so that the product in the container or carrier may drop downwardly by gravity to a dispensing chute or the like when the carrier is aligned with the recess.

2 Claims, 7 Drawing Figures

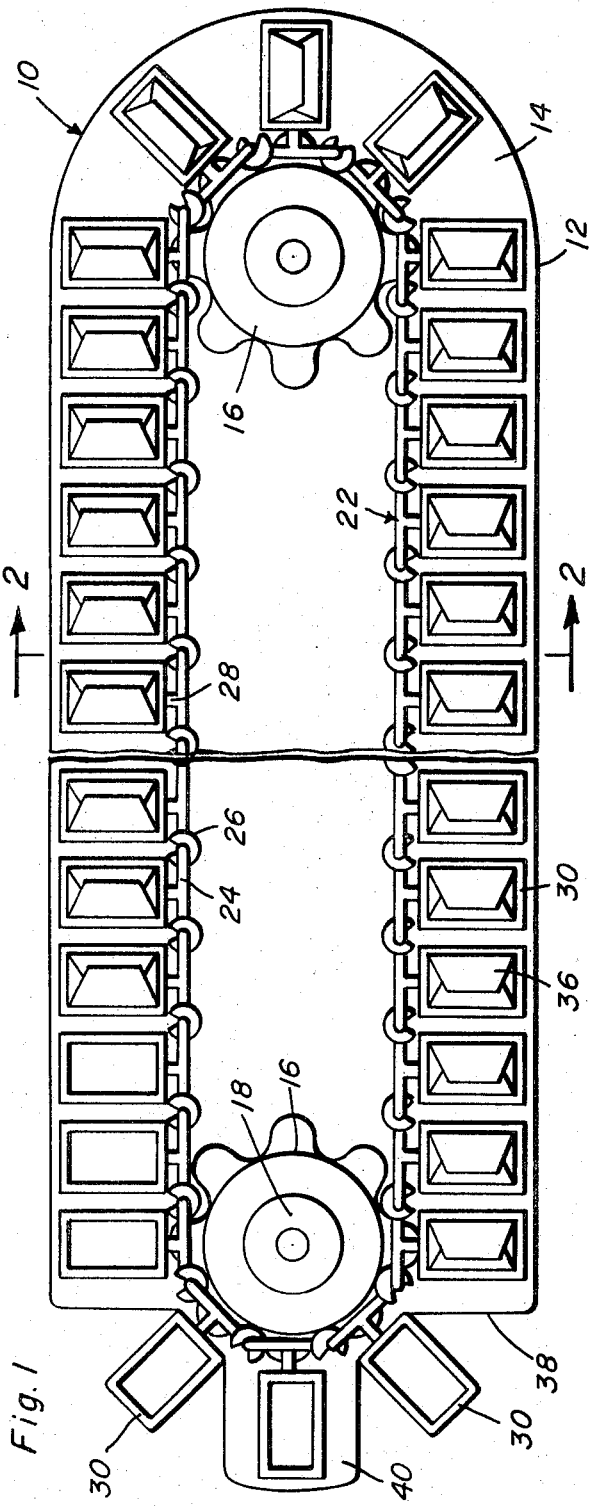
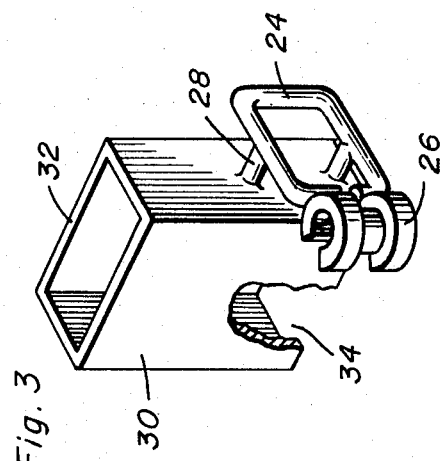
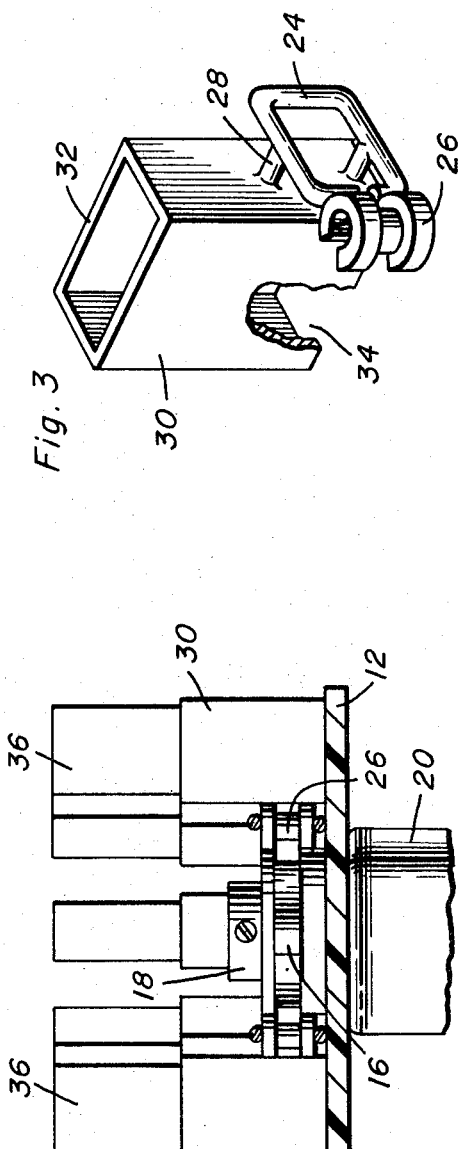

PATENTED JAN 21 1975　　3,861,562

UNIVERSAL VENDING MEANS FOR PACKAGED MATERIALS IN A VENDING DEVICE

CROSS REFERENCE TO RELATED APPLICATION

The assembly of this invention may be employed interchangeably with the dispensing tray disclosed in copending application U.S. Ser. No. 238,816, filed Mar. 28, 1972 by James M. Deaton and Clarence M. Deaton for Vending Machine Dispensing Module Tray which is assigned to the same assignee. BACKGROUND OF THE INVENTION 1. Field of the Invention The present invention generally relates to vending devices and more particularly a modular tray assembly for supporting a plurality of bagged or packaged products for selective discharge to an access area in which the tray includes a shelf underlying an endless chain having a plurality of carriers thereon which have an open top and open bottom with the shelf supporting the products in the carriers until the chain is activated to move a carrier and the product therein to a position where the product will not be supported by the shelf so that the product will drop by gravity to the access area.

2. Description of the Prior Art

Many vending devices have been employed in which a product is placed in a compartment or chamber associated with a conveying apparatus which is operated in a mannner to discharge the products into an access area. Other vending devices employ a supporting rod, supporting clip or the like for receiving a bagged product having a hole therein for receiving a rod or the individual clips may be engaged with the package or product to support the same until discharged to an access area.

Known vending devices have enjoyed some success but have certain problems inherent therein for example, where individual compartments are employed on a conveying device, the number of items and the variety of items that can be supported in a given space is quite limited thereby requiring excessive service time in replenishing the supply of products. When bagged products have a hole punched therein or a separate attaching tab is provided thereon, it is necessary that the person placing the products in the vending device physically attach each product to a supporting rod or other supporting mechanism thereby requiring that each product be individually grasped and accurately positioned with respect to the supporting rod, clip, hook or the like thereby requiring the expenditure of considerable time and labor to replenish the supply of products in the vending device.

SUMMARY OF THE INVENTION

An object of the present invention is to provide a modular tray assembly for a vending device in which a shelf or supporting surface for a plurality of articles to be dispensed is provided together with an endless chain having a plurality of carriers thereon movable in overlying relation to the shelf or surface so that products positioned in the carriers will be supported by the shelf or surface until the carrier moves to a position so that the shelf or surface will not support the article whereby it will drop downwardly by gravity to an access area.

Another object of the invention is to provide a vending device in which the tray or supporting surface may be provided with various structural arrangements to faciltate discharge of the products from the carriers.

A further object of the invention is to provide a vending device in which the carriers are generally in the form of a box-like or basket-like container having an open top and bottom to facilitate loading of the carriers and discharge of the products therefrom.

Still another object of the invention is to provide a vending device with a tray assembly including a supporting shelf or surface that may be provided with various adaptations to effectively discharge products by gravity from the carriers on the endless chain with the tray being relatively inexpensive to manufacture, capable of various arrangements within the vending device and capable of dispensing various products in an efficient manner.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a top plan view of a tray assembly for a vending device.

FIG. 2 is a transverse, sectional view taken substantially upon a plane passing along section line 2—2 of FIG. 1 illustrating the supporting shelf and the relationship to the carriers and products.

FIG. 3 is a perspective view of one of the carriers and plastic chain links illustrating the structural association thereof.

DESCRIPTION OF PREFERRED EMBODIMENTS

Figure 4:
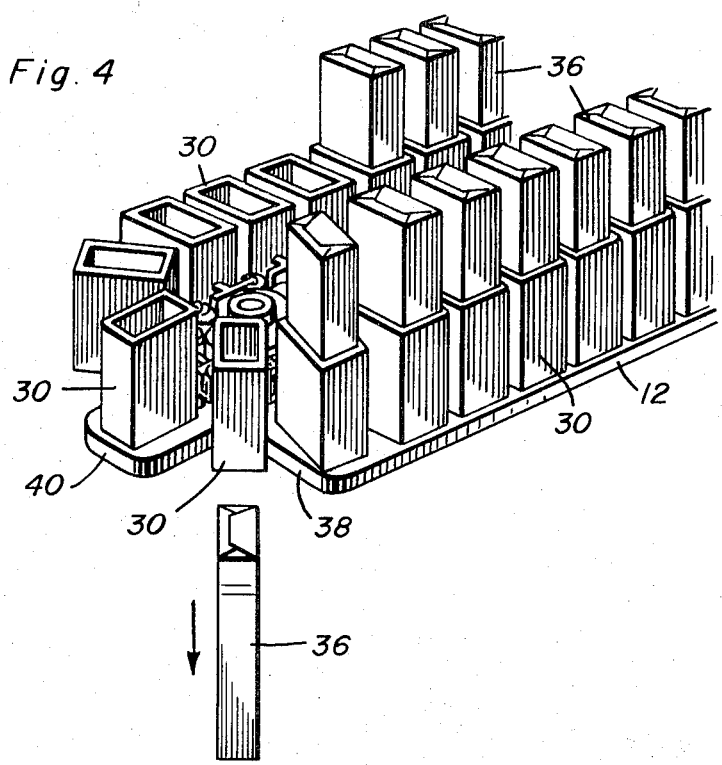
FIG. 4 is a fragmental perspective view illustrating the manner in which products are dispensed from the tray module.

Referring now specifically to the drawings, the tray assembly of the present invention employed in a vending machine is generally designated by reference numeral 10 and includes a supporting shelf structure 12 having a substantially planar, smooth upper surface 14. Adjacent each end of the shelf 12, there is provided a sprocket gear 16 journaled by shaft 18 or the like with one of the sprocket gears being driven by an electric motor 20. The structure of the sprocket gears and drive motor is generally the same as that disclosed in the aforementioned copending application which structure is incorporated herein by reference thereto with the tray assembly being interchangeable with the tray assembly of the copending application with the tray assembly being provided in either single form or in a multiple form in which a plurality of horizontally aligned trays are retained in assembled condition with the trays including electrical connecting means for connecting the electric motor to a source of electrical energy when the tray is positioned in its normal position within the vending machine.

Encircling the sprocket gears 16 is an endless chain 22 constructed from a plurality of plastic links 24 with one end of the link 24 having a split connector sleeve 26 integral therewith which is the same as that disclosed in the aforementioned copending application. Extending laterally from each link 24 is supporting pins 28 to which is connected a carrier 30 in the form of a substantially rectangular box having an open upper end 32 and an open lower end 34 therein with the open lower end or bottom 34 of the carrier 30 being disposed closely adjacent the top surface 14 of the shelf 12 so that packaged or bagged products or any other products 36 vertically positioned in the carrier 30 will be retained in the carrier 30 by virtue of the lower end of the product engaging and being supported by and sliding along the surface 14 of the shelf 12.

At the end of the shelf 12 which is at the front of the vending machine, the shelf is provided with a notch or recessed area 38 which underlies the path of movement of the carrier 30 as it moves around the sprocket gear 16 so that as the carrier 30 passes over the area 38, the product 36 will drop by gravity from the carrier 30 as illustrated in FIG. 4. As illustrated, the notch or recess 38 is duplicated on both sides of the shelf 12 to enable the tray assembly to be used with the chain moving in either the clockwise or counterclockwise direction and the extent of the notch or recess 38 is substantially greater than the area of the carrier 30 to assure that the product 36 will be dropped through the discharged from the carrier 30 without any possibility of the product being sheared by the outer end portion 40 of the shelf 12.

Figure 5:
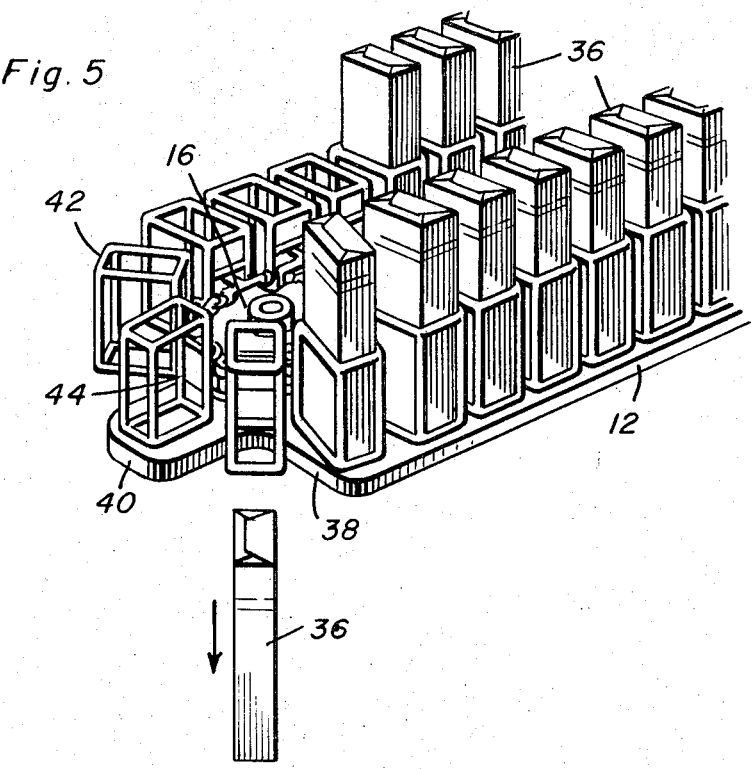
FIG. 5 is a perspective view similar to FIG. 4 but illustrating a different embodiment of the carrier.

FIG. 5 illustrates another embodiment of the invention in which the carrier is designated by reference numeral 42 and is also provided with an open top and an open bottom in the same manner as the carrier 30 in FIGS. 1–4. In this construction, the carrier 42 is defined by peripheral upper and lower frame member interconnected by vertical frame members thus forming an open basket-like carrier for the products. Other than the specific shape and configuration of the carrier 42, all of the structure in FIG. 5 is the same as that in FIG. 4 and the same reference numerals are applied thereto. It is pointed out that the inner wall of the carrier 42 is provided with a plate-like area 44 to which the pins 28 are connected.

Figure 6:
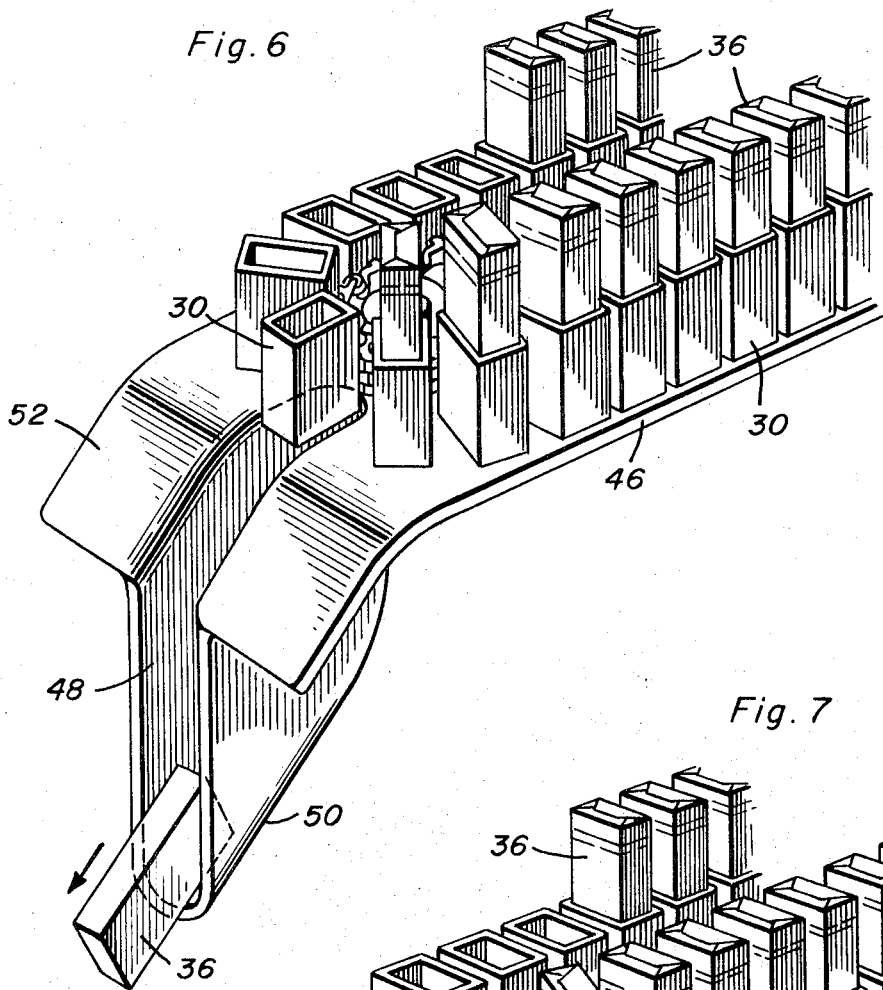
FIG. 6 is a perspective view similar to FIG. 4 but illustrating another type of supporting shelf with a discharge area incorporated therein.

FIG. 6 illustrates another embodiment of the tray assembly in which the carriers are the same as that illustrated in FIGS. 1–4 but in this construction, the shelf is designated by numeral 46 and includes a downwardly extending channel-shaped recess 48 having a bottom defined by an inclined or slanted wall 50. Also, the outer end of the shelf 46 having the slot 48 therein is downwardly slanted as at 52. In this construction, as a carrier 30 passes over the upper end of the recess or slot 48, the product 36 will discharge by gravity into the recess 48 and down the inclined bottom wall 50 to a discharge chute or other access area.

Figure 7:
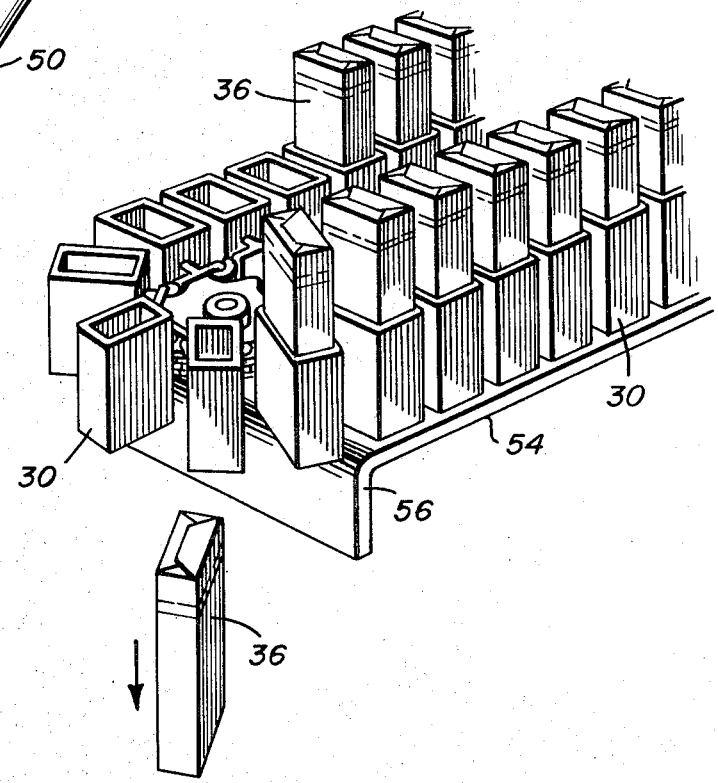
FIG. 7 is a perspective view similar to FIGS. 4 and 6 but illustrating another type of supporting shelf or surface.

FIG. 7 illustrates another embodiment in which the carriers 30 are the same but in this form of the invention, the shelf 54 terminates at its forward end in a depending flange 56 located inwardly of the inner edge of the path of movement of the carriers 30 as they pass around the sprocket gears so that the open bottom of the carriers 30 will be exposed thus enabling the products 36 to discharge downwardly by gravity from the carriers 30 as they pass beyond the flange 56.

Essentially, each embodiment of the invention includes a series of carriers that are of unitary construction with the chain links or they may be attached to the links of a chain in any suitable manner. In each instance, the carrier is in the form of a box-like device having the top and bottom ends thereof open. The chain is motor driven and is operated around the sprockets at each end and as the chain is driven one dispensing increment, all contents or products of the carriers are held in place by the shelf which closes the bottom end of the box carrier except for the front box or carrier which empties its contents through a cutout portion of the bottom shelf. The cutout portion may be notched, a depending flange or a chute or guide for moving the contents of the carrier to the delivery area by gravity. The shelf may be for one module unit or extend to receive several dispensing modules.

The open-ended box or basket-like container which forms the carrier may be of any suitable size to house and carry contents or products and be made of any type of metal, plastic or other material structurally feasible and may be constructed with solid walls, woven material, perforated, open bars or any other configuration that will hold the particular products in place and convey them for dispensing.

The various carriers, links, shelves and the like may be constructed of plastic material, metal or any other material including transparent material to enable observation of the products inasumch as exposure of the contents or products to view is desirable to more effectively sell the products to customers.

As illustrated, the carriers are arranged closely adjacent each other so that when the supply of products is being replenished, a plurality of packages or products may be grasped at a single time and inserted simultaneously into the adjacent carriers thereby greatly reducing the time expended in reloading a vending machine. Also, the vertical orientation of the box-like carriers will retain the products, packages, contents or the like in a generally upright, readily observable position and in a neat and orderly arrangement thereby enhancing the attractiveness of the vending machine in which the tray assembly is incorporated. Also, the particular shape and configuration of the carrier may be varied and the fact that peripheral support is given for the product enables different types of products, packages, bags, contents and the like to be effectively supported for gravity discharge from the carriers.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In a vending machine a customer access area, and visibly enclosing articles or merchandise packages for selection by the customer, a dispensing module including an elongated shelf having a generally horizontally arranged planar, smooth supporting surface, said surface having an omitted area at an end of said shelf adjacent said customer access area, motor driven conveying means including an endless flexible chain trained around a pair of end sprocket gears mounted for rotation above and parallel to said supporting surface, said flexible chain including a plurality of links with said links including vertically spaced lateral support pins thereon, vertically disposed carrier means rigid with said pins, said conveying means being oriented parallel to and above said supporting surface and further including a plurality of said carrier means for movement in a circuitous path over the supporting surface, each said carrier means including a vertically elongated, peripherally continuous sleeve-like, article or package retaining member mounted on the exterior of said endless flexible chain, each article or package retaining member being open at the top and at the bottom to enable an article or package to be inserted from the top and discharged from the bottom, as the conveying means is moved in a circuitous path over said supporting surface and omitted area, the horizontally arranged portion of said supporting surface cooperating with said sleeve-like member and being disposed closely adjacent thereto to close the bottoms of said sleeve-like members while said conveying means is moving over said horizontally arranged portion of said supporting surface, movement of said conveying means normally being in single article dispensing increments, said omitted area of the supporting surface being greater in extent than the cross-sectional area of the retaining member to prevent shear of the article by the edges of the omitted area and to eliminate the necessity of accurate alignment of the retaining members with the omitted area, said supporting surface and omitted area being symmetrical about a longitudinal axis of the supporting surface passing through the axes of rotation of the sprocket gears thereby enabling the sprocket gears and endless chain to be driven in either direction with equal discharging capability, said omitted area being completely free of obstructions to permit free fall of articles and symmetrical about said longitudinal axis at only one end portion of the supporting surface, and said omitted area is defined by a transverse, depending, perpendicular flange adjacent said customer access area at one end of the supporting surface which flange further constitutes a handle means to assist in interchanging modules, said omitted area being continuous between the side edges of the supporting surface.

2. The machine of claim 1 wherein said flange further assists in interchanging a full module for an empty module, one module from a first machine for a second module in a second machine, and similar exchanges.

* * * * *